(12) United States Patent
Fischer

(10) Patent No.: US 9,925,851 B2
(45) Date of Patent: Mar. 27, 2018

(54) BEND OF A METAL SHEET, PREFERABLY IN THE VISUALLY RELEVANT EXTERIOR REGION OF A VEHICLE

(71) Applicant: Bayerische Motoren Werke Aktiengesellschaft, Munich (DE)

(72) Inventor: Burkhard Fischer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/040,421

(22) Filed: Feb. 10, 2016

(65) Prior Publication Data
US 2016/0159209 A1   Jun. 9, 2016

Related U.S. Application Data

(63) Continuation of application No. PCT/EP2014/067028, filed on Aug. 7, 2014.

(30) Foreign Application Priority Data

Aug. 12, 2013  (DE) .................. 10 2013 215 916

(51) Int. Cl.
*B60J 5/04* (2006.01)

(52) U.S. Cl.
CPC ............... *B60J 5/0469* (2013.01); *B60J 5/04* (2013.01)

(58) Field of Classification Search
CPC .. B21D 19/043; B21D 39/21; B60R 13/0243; B60J 5/0469; Y10T 428/12382
See application file for complete search history.

(56) References Cited

U.S. PATENT DOCUMENTS

| | | | | |
|---|---|---|---|---|
| 3,656,577 A | * | 4/1972 | Larsson | ............... E04B 1/86 181/285 |
| 5,948,185 A | * | 9/1999 | Krajewski | ............. B21D 39/02 148/415 |
| 6,332,644 B1 | | 12/2001 | Ito et al. | |
| 2012/0214015 A1 | | 8/2012 | Carsley et al. | |

FOREIGN PATENT DOCUMENTS

| | | |
|---|---|---|
| CN | 1167695 A | 12/1997 |
| DE | 100 12 274 C1 | 9/2001 |
| DE | 10 2012 002 991 A1 | 8/2012 |
| EP | 2 247 396 B1 | 9/2012 |
| JP | 2011-62738 A | 3/2011 |

OTHER PUBLICATIONS

International Search Report (PCT/ISA/210) issued in PCT Application No. PCT/EP2014/067028 dated Oct. 20, 2014 with English-language translation (four (4) pages).

(Continued)

*Primary Examiner* — Adam Krupicka
(74) *Attorney, Agent, or Firm* — Crowell & Moring LLP

(57) ABSTRACT

The present invention relates to a bend of a sheet, preferably in a visually relevant exterior region of a vehicle. In order to provide a bend which enables the separating point between moving and fixed parts to have a visually narrower effect and impart a higher-quality appearance of the entire vehicle, it is provided that the bend is designed in the form of a smooth, harmonic, assembled mathematical curve of the third degree.

12 Claims, 2 Drawing Sheets

(56) References Cited

OTHER PUBLICATIONS

German Search Report issued in counterpart German Application No. 10 2013 215 916.1 dated Apr. 24, 2014 with partial English-language translation (twelve (12) pages).
English-language translation of Chinese Office Action issued in counterpart Chinese Application No. 201480044450.9 dated Nov. 15, 2016 (six (6) pages).
English Translation of Chinese-language Office Action issued in counterpart Chinese Application No. 201480044450.9 dated May 9, 2017 (2 pages).

\* cited by examiner

BEND OF A METAL SHEET, PREFERABLY IN THE VISUALLY RELEVANT EXTERIOR REGION OF A VEHICLE

CROSS REFERENCE TO RELATED APPLICATIONS

This application is a continuation of PCT International Application No. PCT/EP2014/067028, filed Aug. 7, 2014, which claims priority under 35 U.S.C. § 119 from German Patent Application No. 10 2013 215 916.1, filed Aug. 12, 2013, the entire disclosures of which are herein expressly incorporated by reference.

BACKGROUND AND SUMMARY OF THE INVENTION

The invention relates to a bend (fold) of a metal sheet, preferably in the visually relevant exterior region of a vehicle.

Bends of a metal sheet in the visually relevant exterior region of a vehicle are typically carried out by way of a radius, for example in the order of magnitude of 2 to 3 mm. The bent metal sheet is generally located in the movable region of doors, lids and the like, for example. The radius at which the bend is created must be large enough to allow the respective movable edge of a door, lid or the like to be moved without colliding with the fixed parts, taking tolerances into account. This can result in radii that adversely affect the visual appearance. The reason for this is that the visual impression of a joint is determined not only by the joint width, but also by the bending radii of the involved components. While a reduction of the joint width or of the bending radii could improve the visual impression, it would adversely impact a collision-free movement of the involved parts. To continue to allow a collision-free movement, the joint width between the moving and fixed parts would therefore have to be increased with smaller radii; however, this would in turn result in a less desirable appearance.

It is therefore an object of the present invention to provide a bend that causes the separation point between the moving and fixed parts to look visually narrower and, thereby, conveys a higher-quality appearance of the entire vehicle.

This and other objects are achieved according to the invention by designing the bend of a metal sheet, preferably in the visually relevant exterior region of a vehicle, in the form of a smooth, harmonic, assembled mathematical curve of the third degree (spline or polynomial curve).

As a result of the design of the bend according to the invention as a spline or polynomial curve, an optical effect is achieved, which causes the separation point between moving and fixed parts to look visually narrower and conveys a higher-quality appearance of the entire vehicle.

According to a preferred embodiment, the curve of the third degree or the bend is composed of two arcuate segments and a flattened area in the interjacent region.

The radii of the arcuate segments can advantageously have the same size or also different sizes.

According to an advantageous refinement, the flattened area in the interjacent region has a radius that is greater than the radius of the arcuate segments.

Alternatively, the flattened area in the interjacent region can also be designed as a planar chamfer.

In a preferred embodiment, the radius of the arcuate segment is in the low single-digit millimeter range and is preferably 1.5 mm. It is therefore clearly smaller than in conventional bends, where it is in the range of 2 to 3 mm.

Other objects, advantages and novel features of the present invention will become apparent from the following detailed description of one or more preferred embodiments when considered in conjunction with the accompanying drawings.

DETAILED DESCRIPTION OF THE DRAWINGS

The figures show the invention by way of example in the region of a door 1 of a vehicle which adjoins a vehicle part or another door 2. However, the described embodiment can also be provided on another movable or pivotable vehicle part, such as a lid or the like.

The door 1 is provided with a door hinge 1*a* and is pivotable about a pin 1*b* in such a way that the door 1 moves on a circle of rotation 1*c*.

Figure 1:
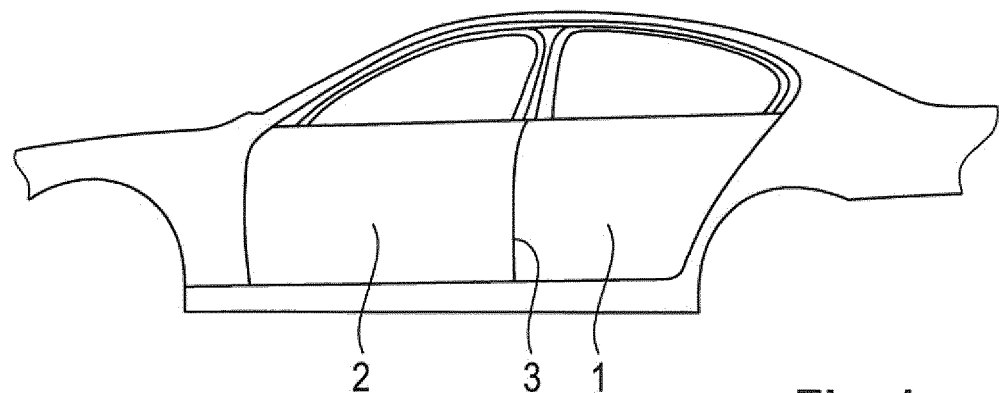
FIG. 1 is a side view of a vehicle.
Figure 2:
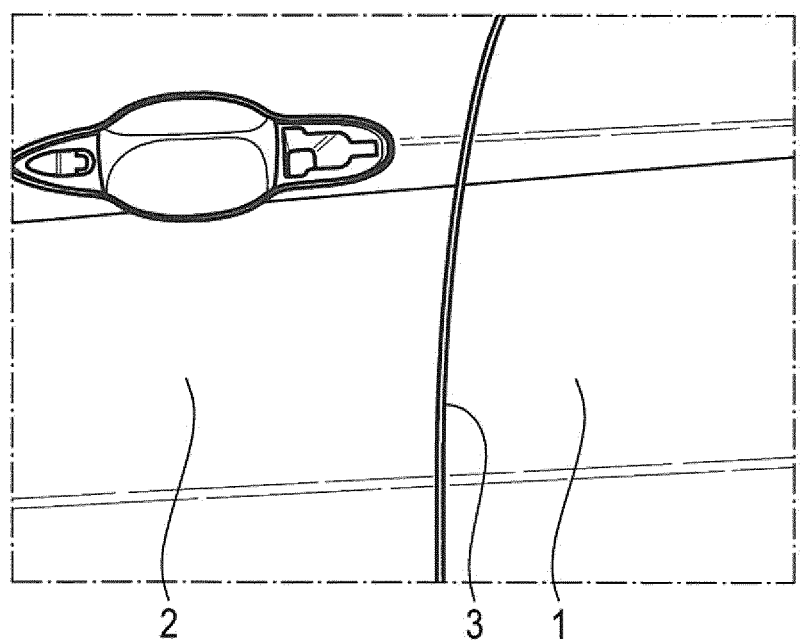
FIG. 2 is a schematic representation of a door of a vehicle.
Figure 3:
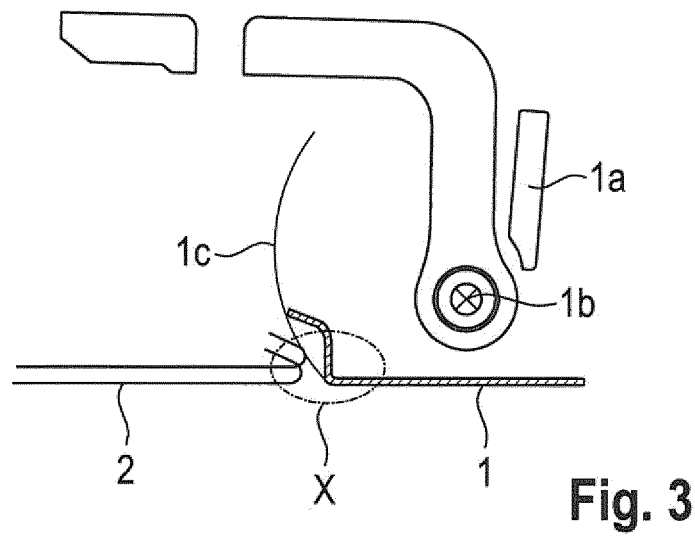
FIG. 3 is a sectional illustration in the region between two doors of the vehicle.
Figure 4:
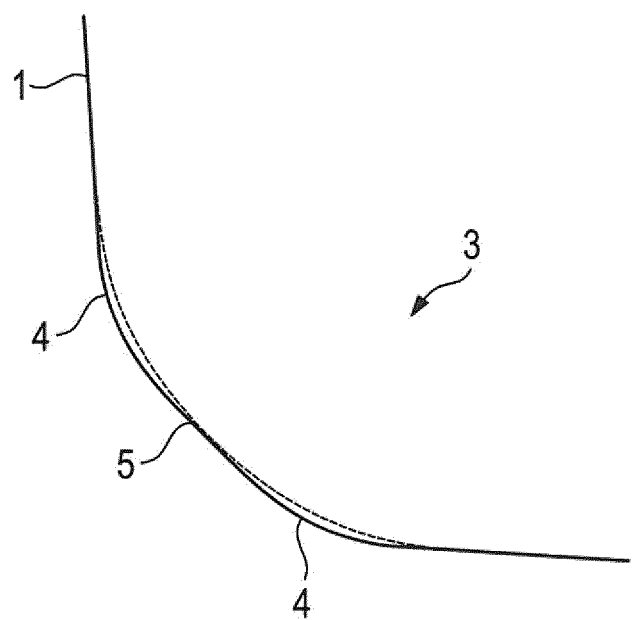
FIG. 4 is an enlarged representation of a portion of detail X of FIG. 2.

At the edge pointing to a fixed vehicle part or another door 2, the metal sheet of the door 1 is provided with a bend 3, which according to the invention has the shape shown in FIG. 4.

The bend 3 is no longer designed as a radius—as in the related art and shown in FIG. 4 as a dotted line—but as a spline, also referred to as a polynomial curve, and therefore has the shape of a smooth, harmonic, assembled mathematical curve of the third degree.

The curve of the third degree or the spline or polynomial curve is advantageously composed of two arcuate segments 4 and a flattened area 5 in the interjacent region.

In the exemplary embodiment shown, the radii of the arcuate segments 4 have the same size; however, they can also have different sizes.

The flattened area 4 located between the arcuate segments 4 has a radius that is greater than the radius of the arcuate segments 4.

The flattened area 5 can—as shown—also be designed as a planar chamfer, which transitions into the arcuate segments 4.

The radius of the arcuate segments 4 is in the low single-digit millimeter range and is preferably 1.5 mm.

LIST OF REFERENCE NUMERALS

1 door
1*a* door hinge
1*b* pin
1*c* circle of rotation
2 vehicle part/other door
3 bend
4 arcuate segment
5 flattened area The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component movably arranged with respect to another component so as not to collide with the another component, the component comprising:
   a metal sheet to be movable along with the component, wherein
   the metal sheet is configured as an exterior visible region of a vehicle,
   the metal sheet has a bend with a smooth, harmonic mathematical curve of a third degree which is composed of two arcuate segments having an identical radius and a flattened area in an interjacent region, and
   the bend is collision-free with the another component during an entire movable motion of the component.

2. The component according to claim 1, wherein the flattened area in the interjacent region has a radius greater than the radius of the two arcuate segments.

3. The component according to claim 1, wherein the flattened area in the interjacent region is designed as a planar chamfer.

4. The component according to claim 1, wherein the radii of the two arcuate segments are in the range of equal to or greater than 1.5 mm and less than 2.0 mm.

5. The component according to claim 1, wherein the radii of the two arcuate segments are 1.5 mm.

6. The component according to claim 1, wherein the mathematical curve of the third degree is a spline curve.

7. The component according to claim 1, wherein the mathematical curve of the third degree is a polynomial curve.

8. The component according to claim 2, wherein the flattened area in the interjacent region is designed as a planar chamfer.

9. A vehicular door to be pivotably movable and arranged so as not to collide with an adjacent door when assembled in a vehicle, the vehicular door comprising:
   a metal sheet to be movable along with the vehicular door, wherein
   the metal sheet has a bend with a smooth, harmonic mathematical curve of a third degree which is composed of two arcuate segments having an identical radius and a flattened area in an interjacent region, and
   the bend is collision-free with the adjacent door during an entire pivotable motion of the vehicular door.

10. A component to be movably arranged with respect to another component so as not to collide with the another component, the component comprising:
    a metal sheet to be movable along with the component, wherein
    the metal sheet is configured as an exterior visible region of a vehicle,
    the metal sheet has a bend with a smooth, harmonic mathematical curve of a third degree which is symmetrical, and
    the bend is collision-free with the another component during an entire movable motion of the component.

11. The component according to claim 10, wherein the mathematical curve of the third degree is a spline curve.

12. The component according to claim 10, wherein the mathematical curve of the third degree is a polynomial curve.

* * * * *